L. MANN AND M. KOPPELMAN.
EGG PACKING.
APPLICATION FILED FEB. 18, 1921.

1,413,047.

Patented Apr. 18, 1922.

2 SHEETS—SHEET 1.

Inventors
Leon Mann and
Morris Koppelman
By their Attorney

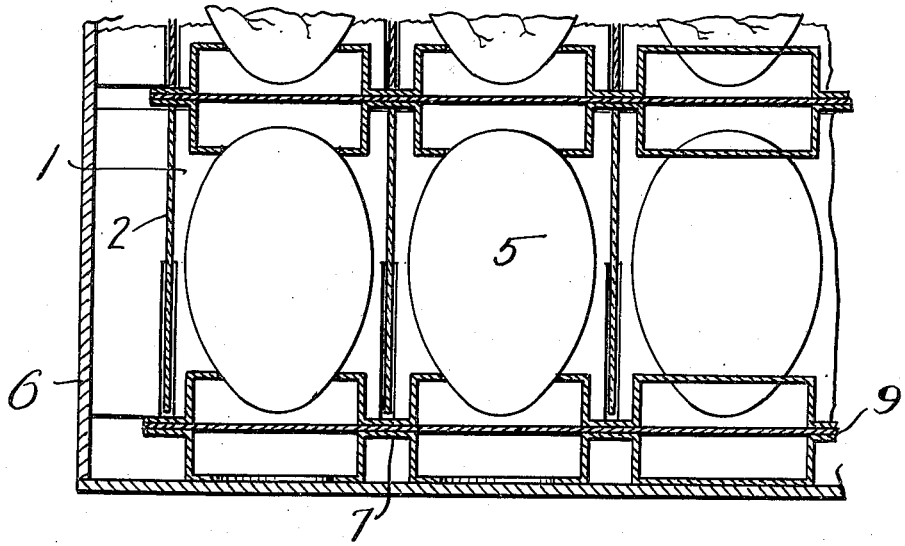
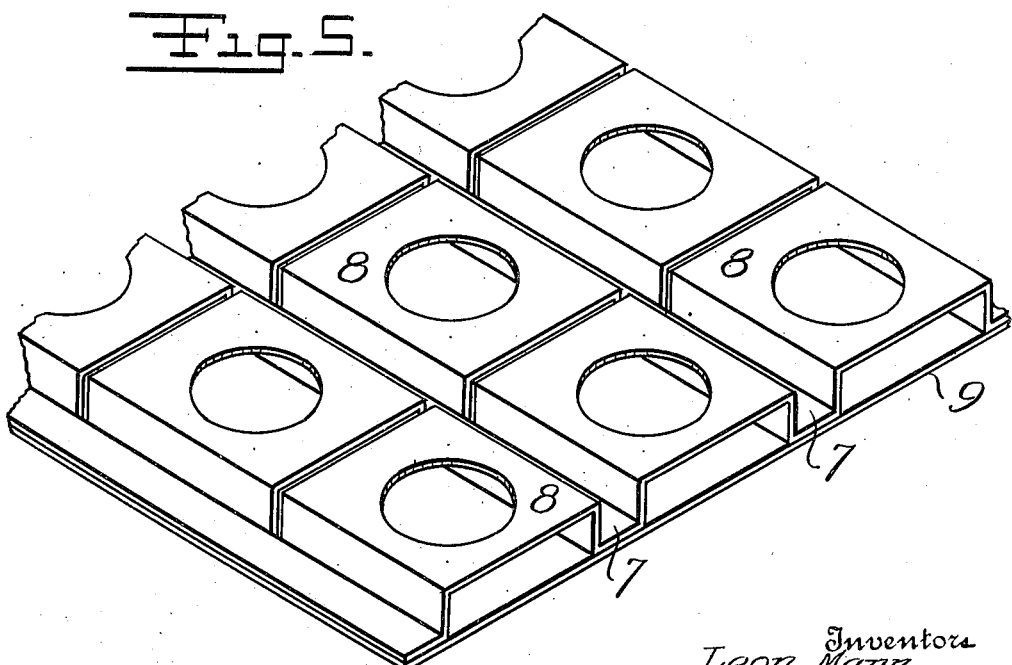

UNITED STATES PATENT OFFICE.

LEON MANN, OF NEW YORK, N. Y., AND MORRIS KOPPELMAN, OF BROOKLYN, NEW YORK.

EGG PACKING.

1,413,047. Specification of Letters Patent. Patented Apr. 18, 1922.

Application filed February 18, 1921. Serial No. 446,056.

*To all whom it may concern:*

Be it known that we, LEON MANN and MORRIS KOPPELMAN, citizens of the United States, and residents, respectively, of the borough of Manhattan, in the county of New York, city and State of New York, and the borough of Brooklyn, in the county of Kings, city and State of New York, have invented certain new and useful Improvements in Egg Packing, of which the following is a specification.

The improvements relate to the packing of eggs and globular articles, which are fragile or likely to be injured by jarring or contact with one another, and their objects are, among others, the provision of means for packing such articles for transportation, storage, and other purposes which will hold them securely, and so as to isolate them from one another and prevent them from being broken or otherwise injured. They are in the nature of improvements on the inventions of applications of Morris Koppelman, No. 394,066, filed July 6, 1920, and No. 436,040, filed January 10, 1921, and employ the essential principles of those inventions.

Figure 1:
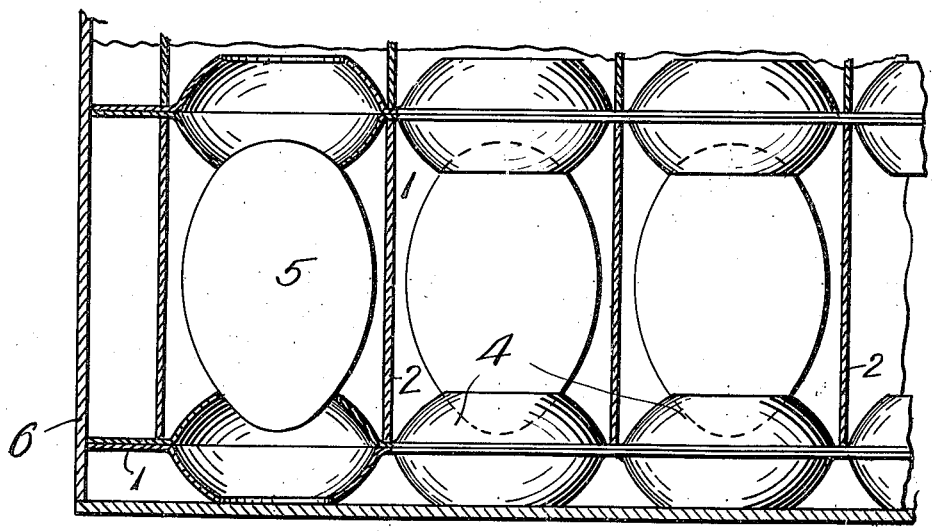
Figure 2:
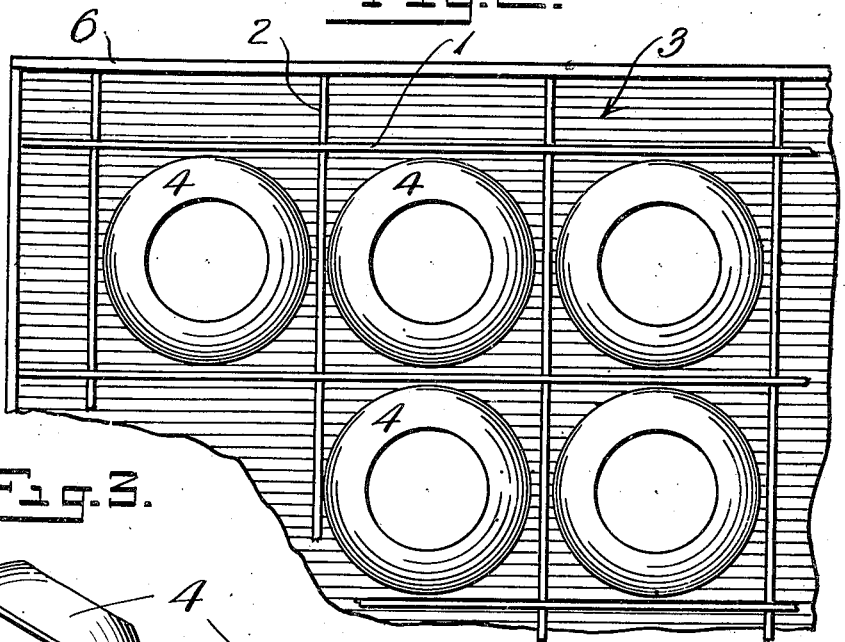
Figure 3:
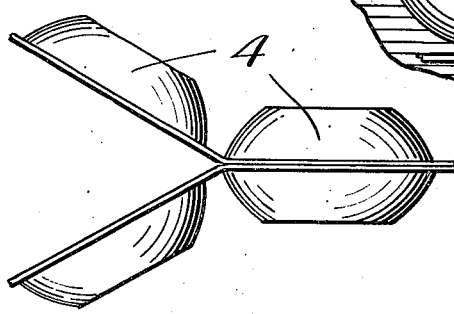

The improvements are illustrated in the accompanying drawings, in which Figure 1 is a vertical, medial section of a portion of the egg packing embodying the improvements, with some of the parts adjacent to the line of cross-section shown in elevation; Figure 2 is a plan of the construction shown in Figure 1; Figure 3 is a side elevation of a detached portion of two of the flat sheets with egg holding cones, the sheets being spread apart to show the manner in which they are placed together; Figure 4 is a vertical section, similar to Figure 1, of a modification; Figure 5 is a perspective of one of the flat sections of Figure 4.

Referring to the preferred construction, a series of cells or compartments each enclosing an egg or other article and spacing and supporting the egg-holding members are formed by intersecting strips of material 1 and 2 arranged vertically and connected at their points of intersection. These cells are arranged in tiers, and any desired number of tiers may be employed. Thus for a half case of fifteen dozen eggs there will be five tiers of cells each carrying three dozen eggs, making fifteen dozen in all. These cells are made so as to fit inside a box or other receptacle 6, the ends of the strips 1 and 2 projecting beyond the cells on all sides to form a cushion.

Between the tiers of cells flat sheets 3, substantially co-extensive therewith horizontally, are interposed, and these sheets have formed therein truncated cones 4 to receive the ends of the eggs. These cones are of approximately the same diameter as the cells and are so arranged that one is at the bottom and one at the top of each cell, while below the bottom of the lowermost tier and above the top of the uppermost are cones which do not act as egg holders, but act as a cushion between the cells and the top and bottom of the case.

Each egg 5 is held with its upper and lower ends in an aperture formed in a conical member, which combines strength and durability and a certain degree of elasticity, so that it cannot move vertically or laterally to any material extent, and is spaced from the walls of its cell and from eggs above and below it, and the upper and lowermost eggs in the case are spaced and cushioned from the case or container by means of similar cones.

In packing the eggs in accordance with the present improvements two flat sheets placed back to back are first placed in the bottom of the case or crate, a tier of cells is then placed over them, the lower edges of the cell walls fitting in between the bases of the cones of the upper sheet, and eggs then placed in the cells with their lower ends positioned in the openings of the upwardly extending truncated cones. Two more sheets arranged in the same manner as the first sheets are now placed on the upper edges of the first tier of cells with the downwardly extending cones fitting into the tops of the cells and the holes therein receiving the upper ends of the eggs. This operation is then repeated until the desired number of eggs have been packed.

The cones 4 may be formed in the sheets by embossing or by forming them of pulp with the sheets by means of suitable molds and dies, and then punching out the egg receiving openings, or the cones may be made separately and applied to the sheets. Any suitable method of construction may be employed. If desired, sheets of flat imperforate material may be placed between the two cone bearing sheets, so as to give added strength to the structure and provide an extra safeguard against contact between the ends of the eggs or contamination of eggs in lower tiers in case an egg in the tier above is broken.

In the modified construction of Figs. 4 and 5 the sheets 7 are corrugated and the holes are in the flat tops 8 of the corrugations, the cells are placed over them in substantially the same manner as in the preferred construction. In this form it is desirable to interpose a flat sheet 9 between the corrugated sheets, and this sheet, if desired, may be extended beyond them or the corrugated sheets and the flat sheets may all be extended laterally so as to come in contact with the side walls of the case. The packing is placed and built up and the eggs positioned in substantially the same manner as in the preferred form.

One of the great advantages of the present form of packing, in addition to its strength, durability, and protective character, resides in the fact that successive layers of eggs may be removed from the case and placed on a table or other flat surface for examination by inspectors, purchasers, and others, and restored again, without disturbing their arrangement or displacing any of the eggs. Another advantage is due to the fact that it eliminates the use of straw or other packing at the bottom and top of the case or crate. It is also possible with this packing to use a certain degree of compression so that despite the fact that the eggs vary in length they will all be securely held at top and bottom in the openings. It is further possible with this construction to use the standard case or crate, which is twelve and one-half inches in height, containing five layers of eggs averaging approximately two and one-fourth inches in length. Other advantages will appear to those familiar with the packing of eggs.

The present egg-holding members have a distinct advantage over those employing spring members in that their relative rigidity holds the eggs, or other articles, firmly, preventing them from moving about in the holders or slipping out, and also provides a secure interlocking relationship between all of the parts. They are also preferably so formed that they can be nested, and packed in a small space for shipping or storage.

What we claim is:

1. The combination of a plurality of horizontally arranged members each consisting of a flat portion, and individual relatively rigid members extending above the flat portion and having therein egg receiving openings, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them.

2. The combination of a plurality of horizontally arranged members each consisting of a flat portion, and relatively rigid individual egg-supporting members extending above the flat portion and having therein egg receiving openings, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them, the said egg supporting members being substantially in the form of truncated cones.

3. The combination of a plurality of horizontally arranged members each consisting of a flat portion, and relatively rigid individual egg-supporting members extending above the flat portion and having therein egg receiving openings, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them, the said egg supporting members extending inwardly and away from the flat portions and the holes being located in the portion thereof which is removed from the flat portion so as to permit the egg to extend therethrough.

4. The combination of a plurality of horizontally arranged members each consisting of a flat portion, and relatively rigid individual egg-supporting imperforate members extending above the flat portion and having therein egg receiving openings, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them, the said spacing and supporting members being positioned between the extending portions.

5. The combination of a plurality of horizontally arranged members each consisting of a flat portion, and relatively rigid individual egg-supporting imperforate members extending above the flat portion and having therein egg receiving openings, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them, the said spacing and supporting members being positioned between the extending portions, and having their upper and lower edges in contact with the flat portions.

6. The combination of a plurality of horizontally arranged members each consisting of a flat portion, and relatively rigid individual egg-supporting members extending above the flat portion and having therein egg receiving openings with imperforate edges, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them.

7. The combination of a plurality of horizontally arranged members each consisting of a flat portion, and relatively rigid individual egg-supporting members extending above the flat portion and having therein egg receiving openings with egg receiving edges, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them.

8. The combination of a plurality of horizontally arranged members each consisting of a flat portion, and relatively rigid individual egg-supporting members extending above the flat portion and having therein egg receiving openings, one of said horizontally arranged members placed below and one above each layer of eggs, and the upper and lower portions of the eggs being located in said openings, and vertically arranged spacing and supporting members between the extending portions, said last named members extending from one to the other of said horizontally arranged members and spacing and supporting them, said extending members being approximately of the same diameter at their bases as the distance between the spacing and supporting members, and the bases of the said spacing and supporting members being positioned and held against material lateral movement thereby.

9. The combination of a plurality of horizontally arranged members, comprising relatively rigid individual egg-supporting conical portions arranged in parallel rows and connecting portions from which said conical portions extend, the said conical portions having apertures therein, the edges of which are spaced from the connecting portions and form an annulus of a size to engage the egg or similar article to be placed therein between its end and its middle portion, and the distance between the said edges and the connecting portions being sufficient to permit the portion of the egg between the point where it is in contact with the said edges and its end to extend between the said edges and connecting portions, and vertical spacing and supporting members positioned between the conical portions and in contact with the connecting portions.

10. The combination of a plurality of horizontally arranged members each consisting of a flat portion and relatively rigid individual egg-supporting portions raised above the flat portion and having therein egg receiving openings with imperforate edges, one of said horizontally arranged members placed below and one above each layer of eggs and the upper and lower portions of the eggs being located in said openings, and vertically arranged spacing and supporting members between the raised portions, said last named members extending from one to the other of said horizontally arranged members and spacing and supporting them.

Witness our hands this 11th day of February, 1921, at the city of New York, in the county and State of New York.

LEON MANN.
MORRIS KOPPELMAN.